INVENTORS
RAYMOND J. CERESA
NOEL E. DAVENPORT
TERENCE L. TRUDGIAN
LEON YESHIN

United States Patent Office 3,493,453
Patented Feb. 3, 1970

3,493,453
PROCESS FOR MAKING LINED METALLIC CONTAINER CLOSURES
Raymond John Ceresa, Caxton, near Cambridge, Noel Ernest Davenport, Kimbolton, and Terence Leslie Trudgian and Leon Yeshin, St. Neots, England, assignors to W. R. Grace & Co., New York, N.Y., a corporation of Connecticut
Filed Sept. 14, 1966, Ser. No. 579,199
Claims priority, application Great Britain, Sept. 15, 1965, 39,424/65
Int. Cl. B32b 31/20
U.S. Cl. 156—293         5 Claims

ABSTRACT OF THE DISCLOSURE

A process of making lined metallic container closures wherein an oxidized ethylene polymer or copolymer is interposed between the metal closure and a molded thermoplastic insert made of an olefinic polymer sealant composition to improve the adhesion between the metal closure and the said insert sealant.

---

Figure 1:
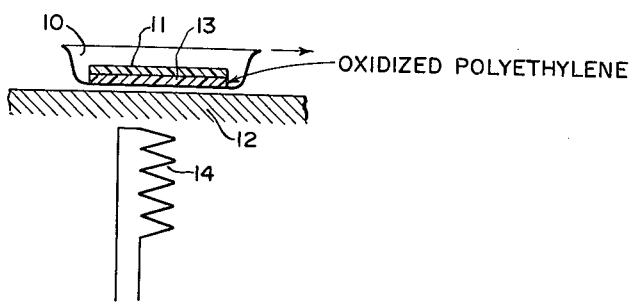

This invention relates to sealing gaskets for the closures of containers fabricated from glass, plastic, metal laminates or other materials, and is an improvement in or modification of the invention described in copending application Ser. No. 504,863, filed Oct. 24, 1965 now abandoned, the disclosure of which is hereby incorporated herein.

When a crown closure is used for capping a bottle, or other container, the gasket is required to conform to possible irregularities in the finish of the lip of the container so as to provide a good seal between the closing face of the metal crown shell and the contents of the container, which frequently contain dissolved gases under pressure. Usually the crown gasket has also the further function of preventing contact of the contents of the container with the metal or lacquered metal of the inner face of the crown shell. Both of these functions require the use of gasketing materials that are essentially impermeable to the contents of the pack, but a much thinner layer is needed to protect the crown shell from contact with the contents than to effect the seal.

Application Ser. No. 504,863 identified above describes the production of container closures by a process which includes inserting a preformed insert of a solid thermoplastic resilient material into a container closure which is warmed sufficiently to cause adequate adhesion of the insert to the closure, and moulding the insert to the required shape with a cold mould under pressure, if necessary after further heating the closure.

It has now been found that the adhesion of the insert to the closure is improved either by incorporating in the material of the insert, or by providing between the insert and the closure a layer of, a solid oxidised polyethylene or copolymer of ethylene with another olefinic or vinyl monomer having a total content of chemically combined oxygen of 0.2–7.5 weight percent. Preferably the oxidised polymer is oxidised polyethylene having a density of 0.937 to 1.050 g./cc., a crystalline melting point of 95°–135° C., a melt index of 0.1–7000, and an oxygen functionality index $$\left(\frac{\text{Carbonyl content (wt. percent)}}{\text{Melt Index}}\right)$$

of at least 0.03. Such oxidised polyethylenes, and their production are described in British patent specifications Nos. 971,998; 988,741; 979,651; 1,019,847; and 978,610 and French patent specification No. 1,422,917. The oxidised polyethylene may be of the high or low density type.

Compositions from which the inserts can be made are described in application Ser. No. 504,863 and include:

(1) Material described in copending application Ser. No. 471,839, filed July 14, 1965, now abandoned.
(2) Copolymers of ethylene and vinyl acetate.
(3) Mixtures of copolymers of ethylene and vinyl acetate with polyethylene.
(4) Copolymers of ethylene and acrylic acid including esters thereof.
(5) Mixtures of copolymers of ethylene and acrylic acid, including esters thereof, with polyethylene.
(6) Plasticised polyvinyl chloride.
(7) Mixtures of copolymers of ethylene and propylene with polyethylene.
(8) Mixtures of polyethylene with chlorosulphonated polyethylene.
(9) Mixtures of polyethylene with butyl rubber.
(10) Mixtures of polyethylene with polyisobutylene.
(11) Mixtures of ethylene/vinyl acetate copolymers with ethylene/propylene copolymers.
(12) Mixtures of any of the compositions (4), (5), (7), (8), (9), and (10) with ethylene/vinyl acetate copolymers, in particular mixtures of polyethylene, butyl rubber, and ethylene/vinyl acetate copolymers.
(13) Polyethylene.
(14) Mixtures of polyethylenes of different densities, molecular weights, or molecular weight distributions.

Figure 2:
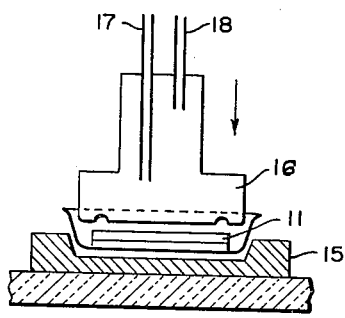
Figure 3:
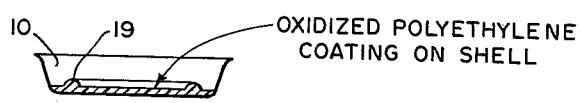

The invention is diagrammatically illustrated in FIGURES 1, 2, and 3. In FIG. 1, a metallic closure shell 10, is shown with an insert 11, comprising a layer 12, of oxidized polyethylene covered with a sealing compound 13. The fact that the closure is heated at this time is indicated by the conventionalized resistance heater 14, placed beneath the closure.

In FIG. 2, the method of molding is illustrated. The closure with the insert 11, is moved to an insulated pocket 15, to prevent heat loss where the hot insert 11, is molded by pressure applied from the water-cooled die 16. Tubes 17 and 18, carry cooling fluid to the die.

Instead of a laminated insert or a solid insert of oxidized polyethylene, FIG. 3 shows a shell 10, bearing a lacquer-like coating 19, of oxidized polyethylene. Inserts molded against this oxidized polyethylene lacquered surface are securely bonded to the shell 10.

An important result of the use of the oxidised ethylene polymer is to improve the adhesion between the gasket or lining insert and the metal or lacquered surface of the closure. This improvement is most marked in compositions which, apart from the oxidised polymer, are substantially without constituents containing polar groups, such as those numbered 7, 9, 10, 13, and 14 in the above list. Improved adhesion is achieved with both tinplate and aluminium crowns.

In one aspect therefore the invention comprises a process for the production of container closures which includes inserting a preformed insert of a solid thermoplastic resilient material into a container closure which is warmed sufficiently to cause adequate adhesion of the insert to the closure, and moulding the insert to the required shape with a cold mould under pressure, if necessary after further heating the closure, in which the insert consists of one of the compositions listed above modified in that it comprises an oxidised ethylene polymer as hereinbefore described. The invention comprises also crown and other closures so obtained. The proportion of such oxidised polymer required in the composition will vary to some extent with its carbonyl content, a given effect being obtainable with a proportion which is smaller the higher the carbonyl content. Generally speaking, the proportion should be at least about 5% by weight. When the composition already contains polyethylene, part or all of this may be replaced by the oxidised polymer; alternatively (and of course necessarily in other cases) the oxidised polymer may be an additional component. Thus for example the liner may consist of 5–100% of oxidised polymer, the balance being a high or low density polyethylene (the latter being preferred), with or without also a further component such as an ethylene/propylene copolymer, butyl rubber, or polyisobutylene, or such components may be used without the unoxidised polyethylene. It is usually preferable to use between about 10 and 60% by weight of the oxidised ethylene polymer based on the weight of the insert.

In a modification of the invention the oxidized polymer, instead of being actually incorporated in the composition from which the insert is made, may be present as a separate layer between the insert and the metal or lacquered surface. This embodiment of the invention is also of special importance when the composition from which the insert is made contains few or no polar groups, though it can be used in other cases also. For example, the insert may be formed as a laminate, having a surface layer, which can be very thin, of oxidized ethylene polymer on that side which is to make contact with the metal or lacquered surface of the closure; such a coating may be for example about 0.1–5 mils (0.0025–0.125 mm.) thick and may be formed in a known way by deposition of the oxidised polymer from solution in an organic, especially a hydrocarbon or halogenated hydrocarbon, solvent. Alternatively a sheet of oxidised polymer of similar thickness may be laminated by means of heat and pressure to a sheet of the composition from which the inserts are to be formed. The oxidised polymer or blends containing it as a melt, solution or emulsion may be used as adhesives to stick solid moulded polyethylene or compounded polyethylene liners to the closures.

On the other hand the oxidised ethylene polymer may initially be present as a coating on the surface of the closure. For example an aqueous emulsion of oxidised polyethylene (obtained for instance as described in British patent specification No. 978,610), may be applied to the closure or, more usually, to a metal sheet from which the closure is to be made, and coagulated by air drying or oven drying at a temperature sufficient to form a coherent film. Oxidised ethylene polymer or blends of oxidised ethylene polymer with paraffin wax or other waxes, emulsions or solutions of oxidised ethylene polymer with or without other components may take the place of drawing or stamping lubricants, which may, for example, be based upon a wax such as paraffin wax or an oil such as white oil and are applied to the metal sheet from which the closure is punched out. In this way a separate coating step may be avoided. Metal sheets or the closures themselves may also be coated by applying a hot melt or a powder spray of the oxidised ethylene polymer. Alternatively the oxidised ethylene polymer may be deposited from a solution or dispersion in an organic solvent, e.g. an aromatic hydrocarbon such as xylene. The coating so formed may replace the conventional lacquer coating, or if desired may be in addition to, or a part of, the closure lacquer coating.

Application Ser. No. 504,863 describes a number of advantages which arise from the cold mould processes, and these are obtained also when an oxidised ethylene polymer is used as described herein. The operating details of the process are not substantially altered, and the same types of closures can be made, including not only crowns of the standard intermediate or short skirt type, but also, for example, pilfer-proof caps, lug caps, plastic caps, rolled-on caps and crimped-on caps. Likewise the apparatus used in making the closures can be as described and illustrated in application Ser. No. 504,863. Moreover, as there described, the lining produced may comprise a relatively thin central panel, whose functions is primarily to prevent contact of the contents of the container with the metal or lacquered surface of the closure shell, and a thicker outer annular portion which serves to form the seal.

Fillers, pigments, colouring materials, slip agents, blowing agents, cork particles, resins, rust inhibitors, and other conventional additives may be added to any of the compositions from which the inserts are made as required to give particular effects. When a blowing agent is present, it is usually found that the thin protective panel section of the liner is not, or not greatly, expanded, while the raised annular sealing section has a typical cellular structure. Blowing agents and other additives can be of the conventional kinds. Thus, typical pigments that may be used are titanium dioxide and carbon black, while as blowing agents there may be used known azo compounds, e.g. azobiscarbonamide. As fillers may be mentioned chalk (and other forms of calcium carbonate), barytes and clays, and as slip agents silicones and waxes. Suitable resins include rosin and rosin esters and terpene resins. Rust inhibitors include for example sodium benzoate, which may be present for example in amount 1–3% of the weight of the composition.

The invention is illustrated by the following examples, in which "parts" and proportions are by weight.

Example 1

The following constituents were mixed in an internal Banbury mixer for 7 minutes at a stock temperature of 150° C.

| | Parts |
|---|---|
| Butyl rubber | 45 |
| Low density polyethylene (density 0.919 g./cc.; melt index 1.0) | 45 |
| Oxidised polyethylene | 10 |
| Zinc dimethyldithiocarbamate | 0.045 |

The butyl rubber had 1.5–2 mol percent unsaturation and a Mooney viscosity at 100° C. (3 minutes) of 71.

The oxidised polyethylene had a density of 0.99, a crystalline melting point of 128°–130° C., an acid number of 26–32, a total oxygen content of 3.06% and a total carbonyl content of 0.71 milli-equivalents/gram.

After the mixing, the load was discharged hot into the throat of a hot melt extruder and extruded as 0.3 cm. strands which were pelletised after being passed through a water bath. The pellets were then converted into sheets 1.6 mm. thick and 71 cm. wide by means of a 6.35 cm. Davis extruder. Discs 1.14 cm. in diameter were cut from the sheet and centrally inserted into crown shells coated with an epoxy-phenolic lacquer and heated to 100° C. The crown and the insert were then heated to 170° C. and moulded using a water-cooled moulding piece to give a liner of weight 150 mg. Adhesion between the liner and the shell was found to be excellent, as was the sealing performance of the closure under a wide variety of conditions.

Example 2

A low density oxidised polyethylene of density 0.932, melt index 152, and COOH content 0.2 meq./gram was dissolved in hot xylene to give a 10% solution. This solution was coated onto one side of 1.5 mm. pressed sheet of a 50/50 blend of low density polyethylene and butyl rubber, and the solvent allowed to evaporate overnight. The thickness of the coating was between 0.025 and 0.075 mm. Discs of diameter 1.14 cm. were cut from the laminate lacquer and inserted with the coated side downwards on the epoxy/phenolic lacquer of the crown shells of Example 1. Moulded liners were prepared as in Example 1 which had excellent adhesion and gave satisfactory sealing performance.

Example 3

A sheet of low density oxidised polyethylene as described in Example 2 was pressed to 0.25 mm. thickness on a hydraulic press at 120° C. for 3 minutes. This film was then laminated to a 1.5 mm. thick sheet of low density polyethylene of melt index 20 and density 0.921 using a hydraulic press at a temperature of 130° C., pressing for one minute. Discs 1.14 cm. in diameter were cut from the laminated sheet and treated as in Example 3.

Example 4

Oxidised polyethylene having a density of 0.990 g./cc., a crystalline melting point of 128–130° C., a total oxygen content of 3.48% and a total carbonyl content of 0.68 meq./g., was emulsified anionically using the following recipe:

| | |
|---|---|
| Oxidised polyethylene | 100 |
| Oleic acid | 18 |
| Morpholine | 18 |
| Water | 250 |

The resin, emulsifier, acid and water were first mixed in a stirred vessel capable of withstanding 4.55 kg./cm.² gauge with the vent open. The vent was then closed and the mixture was heated to 150° C. and maintained at 150°–155° C. for 30 minutes with stirring after which the vessel was allowed to cool. The vent was opened when the temperature had fallen to 95° C. When the temperature had dropped below 70° C. the emulsion was removed.

This aqueous emulsion was diluted to a total solids content of 20–25% and coated into epoxy lacquered crown shells which were then dried at 100° C. for 5–20 minutes to give a continuous film of oxidised polyethylene, having a thickness of 0.012–0.075 mm.

Discs of a low density polyethylene of density 0.916 g./cc. and melt index of 20, were cut, inserted and molded, as described in Example 1, into the above prepared crown shells to give a film weight of 150 mg. Adhesion between the liner and the shell was found to be excellent as was the sealing performances of the closure under a wide variety of conditions.

Example 5

A low density oxidised polyethylene as described in Example 2, was dissolved in xylene to give a 10% solution. This solution was coated onto crown shells having an epoxy lacquer finish. The crowns were warmed at 100° C. for 5 minutes to remove the solvent, after which time a hard film of oxidised polyethylene had formed in the crown shell.

Discs of a low density polyethylene having a density of 0.916 and a melt index of 20, were inserted into the shells and moulded as described in Example 1. The adhesion of the polyethylene discs to the coated crowns was substantially improved compared with the case of discs inserted into uncoated crown shells.

Although the invention has been described with particular reference to oxidised polyethylene, it is possible to use a product obtained by oxidising a copolymer of ethylene with another olefinic or vinyl monomer especially the ethylene/butylene copolymers described in French patent specification No. 1,422,917 and the ethylene/vinyl acetate copolymers described in application Ser. No. 504,863.

What we claim is:

1. In a process for the production of lined metallic container closures which includes inserting a sealing substance formed of a solid thermoplastic olefinic polymer into the closure and molding the inserted polymer to the required shape by pressure, that improvement which includes incorporating on at least one of the opposed surfaces between the metal and said polymer a material selected from the group consisting of solid oxidised polyethylene and a solid oxidised copolymer of ethylene and another olefinic monomer having a total content of chemically combined oxygen of 0.2 to 7.5 weight percent, whereby improved adhesion of the resulting seal to the metal is secured.

2. Process according to claim 1, wherein oxidised polyethylene is employed having a density of 0.937 to 1.050 g./cc., a crystalline melting point of 95°–135° C., a melt index of 0.1 to 7000 and an oxygen functionality index of at least 0.03.

3. Process according to claim 1, wherein the oxidised polymer is incorporated in the material of the insert to the extent of 10 to 60% by weight based on the weight of the insert.

4. Process according to claim 1, wherein the insert comprises a surface layer of the oxidised ethylene polymer on that side which is to make contact with the closure.

5. Process according to claim 1, wherein the oxidised ethylene polymer is applied as a coating on the surface of the closure.

References Cited

UNITED STATES PATENTS

| | | | |
|---|---|---|---|
| 2,688,776 | 9/1954 | Evans et al. | 264—268 |
| 2,968,576 | 1/1961 | Keller et al. | 117—47 |
| 3,060,163 | 10/1962 | Erchak | 260—94.9 |
| 3,202,307 | 8/1965 | Rainer et al. | 215—39 |
| 3,376,372 | 4/1968 | Kuespert | 264—268 |
| 3,442,411 | 5/1969 | Mahoney | 264—268 X |
| 3,445,412 | 5/1969 | Gerhardt et al. | 156—334 X |

HAROLD ANSHER, Primary Examiner

U.S. Cl. X.R.

156—212, 224, 334; 161—252; 215—41; 264—268